(12) United States Patent
Borthakur et al.

(10) Patent No.: US 7,487,138 B2
(45) Date of Patent: Feb. 3, 2009

(54) SYSTEM AND METHOD FOR CHUNK-BASED INDEXING OF FILE SYSTEM CONTENT

(75) Inventors: Dhrubajyoti Borthakur, San Jose, CA (US); Serge Pashenkov, Redwood City, CA (US)

(73) Assignee: Symantec Operating Corporation, Cupertino, CA (US)

( * ) Notice: Subject to any disclaimer, the term of this patent is extended or adjusted under 35 U.S.C. 154(b) by 498 days.

(21) Appl. No.: 10/926,432

(22) Filed: Aug. 25, 2004

(65) Prior Publication Data

US 2006/0059171 A1    Mar. 16, 2006

(51) Int. Cl.
G06F 7/00     (2006.01)
G06F 17/30    (2006.01)

(52) U.S. Cl. .................. 707/2; 707/4; 707/5; 707/6; 707/9

(58) Field of Classification Search ............ 707/2, 707/3, 5, 6
See application file for complete search history.

(56) References Cited

U.S. PATENT DOCUMENTS

| | | | | |
|---|---|---|---|---|
| 5,404,296 A * | 4/1995 | Moorhead | | 702/14 |
| 5,627,936 A * | 5/1997 | Prasad et al. | | 386/96 |
| 5,701,469 A * | 12/1997 | Brandli et al. | | 707/102 |
| 5,754,844 A * | 5/1998 | Fuller | | 707/6 |
| 5,778,361 A * | 7/1998 | Nanjo et al. | | 707/5 |
| 5,848,410 A * | 12/1998 | Walls et al. | | 707/4 |
| 5,878,410 A * | 3/1999 | Zbikowski et al. | | 707/2 |
| 5,890,147 A | 3/1999 | Peltonen | | |
| 5,907,837 A | 5/1999 | Ferrell | | |
| 5,991,542 A * | 11/1999 | Han et al. | | 717/167 |
| 5,999,943 A * | 12/1999 | Nori et al. | | 707/104.1 |
| 6,026,474 A | 2/2000 | Carter | | |
| 6,061,678 A * | 5/2000 | Klein et al. | | 707/3 |
| 6,067,541 A * | 5/2000 | Raju et al. | | 707/3 |
| 6,094,649 A * | 7/2000 | Bowen et al. | | 707/3 |
| 6,209,000 B1 * | 3/2001 | Klein et al. | | 707/203 |
| 6,216,257 B1 | 4/2001 | Agrawal et al. | | |
| 6,240,401 B1 | 5/2001 | Oren | | |
| 6,240,429 B1 | 5/2001 | Thornton | | |
| 6,243,718 B1 * | 6/2001 | Klein et al. | | 707/203 |

(Continued)

OTHER PUBLICATIONS

Burra Gopal, "Integrating Content-Based Access Mechanism With Hierarchical File System," The University of Arizona, pp. 1-109, 1997.*

(Continued)

*Primary Examiner*—Hosain T Alam
*Assistant Examiner*—Usmaan Saeed
(74) *Attorney, Agent, or Firm*—Meyertons Hood Kivlin Kowert & Goetzel, P.C.; B. Noël Kivlin; Anthony M. Petro

(57) ABSTRACT

A system and method for chunk-based indexing of file system content. In one embodiment, the system may include a storage device configured to store data and a file system configured to manage access to the storage device and to store file system content including a plurality of files. The system may further include a search engine configured to construct an index of the file system content. The file system may be further configured to partition a given one of the plurality of files into a plurality of logical chunks, and constructing an index may include generating respective index information associated with each of the plurality of logical chunks.

24 Claims, 7 Drawing Sheets

U.S. PATENT DOCUMENTS

| | | | |
|---|---|---|---|
| 6,286,013 | B1 | 9/2001 | Reynolds |
| 6,292,795 | B1* | 9/2001 | Peters et al. .................... 707/3 |
| 6,326,964 | B1* | 12/2001 | Snyder et al. ............... 345/419 |
| 6,374,260 | B1 | 4/2002 | Borthakur |
| 6,389,538 | B1 | 5/2002 | Gruse |
| 6,522,268 | B2 | 2/2003 | Belu |
| 6,578,044 | B1* | 6/2003 | Scheifler et al. ......... 707/103 R |
| 6,615,204 | B1* | 9/2003 | Menon ........................... 707/3 |
| 6,662,176 | B2* | 12/2003 | Brunet et al. .................. 707/2 |
| 6,738,790 | B1* | 5/2004 | Klein et al. ................. 707/203 |
| 6,785,786 | B1* | 8/2004 | Gold et al. .................. 711/162 |
| 6,820,094 | B1* | 11/2004 | Ferguson et al. ............ 707/200 |
| 6,938,083 | B1 | 8/2005 | Teague |
| 6,970,866 | B1 | 11/2005 | Pravetz |
| 7,013,331 | B2 | 3/2006 | Das |
| 7,016,914 | B2* | 3/2006 | Nayak ........................ 707/102 |
| 7,020,658 | B1 | 3/2006 | Hill |
| 7,058,624 | B2 | 6/2006 | Masters |
| 7,152,165 | B1* | 12/2006 | Maheshwari et al. ........ 713/193 |
| 7,188,118 | B2 | 3/2007 | Borthakur et al. |
| 7,222,119 | B1* | 5/2007 | Ghemawat et al. ............. 707/9 |
| 2001/0025311 | A1 | 9/2001 | Arai |
| 2002/0049731 | A1 | 4/2002 | Kotani |
| 2003/0093556 | A1 | 5/2003 | Yeung |
| 2003/0101238 | A1* | 5/2003 | Davison ..................... 709/219 |
| 2003/0151633 | A1 | 8/2003 | George |
| 2003/0154271 | A1 | 8/2003 | Baldwin |
| 2003/0172368 | A1 | 9/2003 | Alumbaugh |
| 2004/0002942 | A1 | 1/2004 | Pudipeddi |
| 2004/0059866 | A1 | 3/2004 | Patel |
| 2004/0143569 | A1* | 7/2004 | Gross et al. .................... 707/3 |
| 2004/0225730 | A1 | 11/2004 | Brown |
| 2004/0243554 | A1 | 12/2004 | Broder |
| 2005/0015461 | A1* | 1/2005 | Richard et al. .............. 709/217 |
| 2005/0038813 | A1 | 2/2005 | Apparao |
| 2005/0050107 | A1 | 3/2005 | Mane |
| 2005/0086192 | A1* | 4/2005 | Kodama ........................ 707/1 |
| 2005/0114363 | A1 | 5/2005 | Borthakur |
| 2005/0114381 | A1 | 5/2005 | Borthakur |
| 2005/0114406 | A1 | 5/2005 | Borthakur |
| 2005/0131939 | A1* | 6/2005 | Douglis et al. ........... 707/103 Y |
| 2005/0198010 | A1 | 9/2005 | Borthakur |
| 2005/0268068 | A1* | 12/2005 | Ignatius et al. ............... 711/202 |
| 2005/0289601 | A1* | 12/2005 | Park et al. ...................... 725/54 |
| 2006/0004759 | A1 | 1/2006 | Borthakur et al. |
| 2006/0004787 | A1 | 1/2006 | Borthakur |
| 2006/0059204 | A1 | 3/2006 | Borthakur et al. |
| 2006/0074912 | A1 | 4/2006 | Borthakur |

OTHER PUBLICATIONS

"Integrating Content-Based Access Mechanisms with Hierarchical File Systems", Gopal, et al, Proceedings of the 3rd Symposium on Operating Systems Design and Implementation, New Orleans, LA, Feb. 1999.

"Semantic File Systems", Gifford, et al, 13th ACM Symposium on Operating Systems Principles, *ACM Operating Systems Review*, Oct. 1991, pp. 16-25.

"The Business Rationale for Distributed (Remote) Document Capture," Verity White Paper, Oct. 2003, downloaded from http://www.cardiff.com/cms/groups/public/documents/collateral/mk0535.pdf, 12 pages.

"Native XML Management With Documentum," Documentum Technical White Paper, Jul. 2003, downloaded from http://software.emc.com/collateral/content_management/documentum_family/wp_tech_xml.pdf, 15 pages.

Autonomy XML White Paper, Oct. 2003, downloaded from http://www.autonomy.com/content/downloads/White% 20Papers/index.en.html, 11 pages.

Autonomy Technology White Paper, Nov. 2003, downloaded from http://www.autonomy.com/content/downloads/ White%20Papers/index.en.html, 19 pages.

"DCMI Abstract Data Model," Dublin Core Metadata Initiative, Feb. 2004, downloaded from http://www.ukoln.ac. uk/metadata/dcmi/abstract-model/2004-02-04/, 17 pages.

Staples et al., "The Fedora Project: An Open-source Digital Object Repository Management System," in D-Lib Magazine, v. 9, No. 4, Apr. 2003, downloaded from http://web.archive.org/web/20040203065018/www.dlib.org/dlib/ april03/staples/04staples.html, 12 pages.

Wildermuth, "A Developer's Perspective on WinFS: Part 1," Mar. 2004, downloaded from http://web.archive.org/ web/20050414063209/http://msdn.microsoft.com/data/winfs/default.aspx?pull=/library/en-us/dnwinfsta/html/winfsdevpersp.asp, 10 pages.

* cited by examiner

SYSTEM AND METHOD FOR CHUNK-BASED INDEXING OF FILE SYSTEM CONTENT

BACKGROUND

1. Field of the Invention

This invention relates to computer systems and, more particularly, to file-based storage systems.

2. Description of the Related Art

Computer systems often process large quantities of information, including application data and executable code configured to process such data. In numerous embodiments, computer systems provide various types of mass storage devices configured to store data, such as magnetic and optical disk drives, tape drives, etc. To provide a regular and systematic interface through which to access their stored data, such storage devices are frequently organized into hierarchies of files by software such as an operating system. Often a file defines a minimum level of data granularity that a user can manipulate within a storage device, although various applications and operating system processes may operate on data within a file at a lower level of granularity than the entire file.

As the number of files and the amount of data stored therein increases, efficiently locating and retrieving file data becomes more challenging. Various kinds of search technology may be employed to locate data satisfying specified characteristics, such as file names or data patterns stored within files. To improve search performance, some search technologies employ indexing of the target data to be searched (e.g., file data), through which desired content may be more readily accessed.

However, creating indexes may consume substantial processing time and resources, particularly if the amount of data to be indexed is large and changes frequently. Therefore, unnecessarily indexing content may result in a waste of processing time and resources, potentially degrading system performance.

SUMMARY

Various embodiments of a system and method for chunk-based indexing of file system content are disclosed. In one embodiment, the system may include a storage device configured to store data and a file system configured to manage access to the storage device and to store file system content including a plurality of files. The system may further include a search engine configured to construct an index of the file system content. The file system may be further configured to partition a given one of the plurality of files into a plurality of logical chunks, and constructing an index may include generating respective index information associated with each of the plurality of logical chunks.

In one specific implementation of the system, in response to detecting an operation to modify the given file, the file system may be further configured to identify one or more modified logical chunks of the given file. The search engine may be further configured to regenerate respective index information associated with each of the one or more modified logical chunks.

A method is further contemplated that, in one embodiment, includes storing file system content including a plurality of files, partitioning a given one of the plurality of files into a plurality of logical chunks, and generating respective index information associated with each of the plurality of logical chunks.

Figure 1:
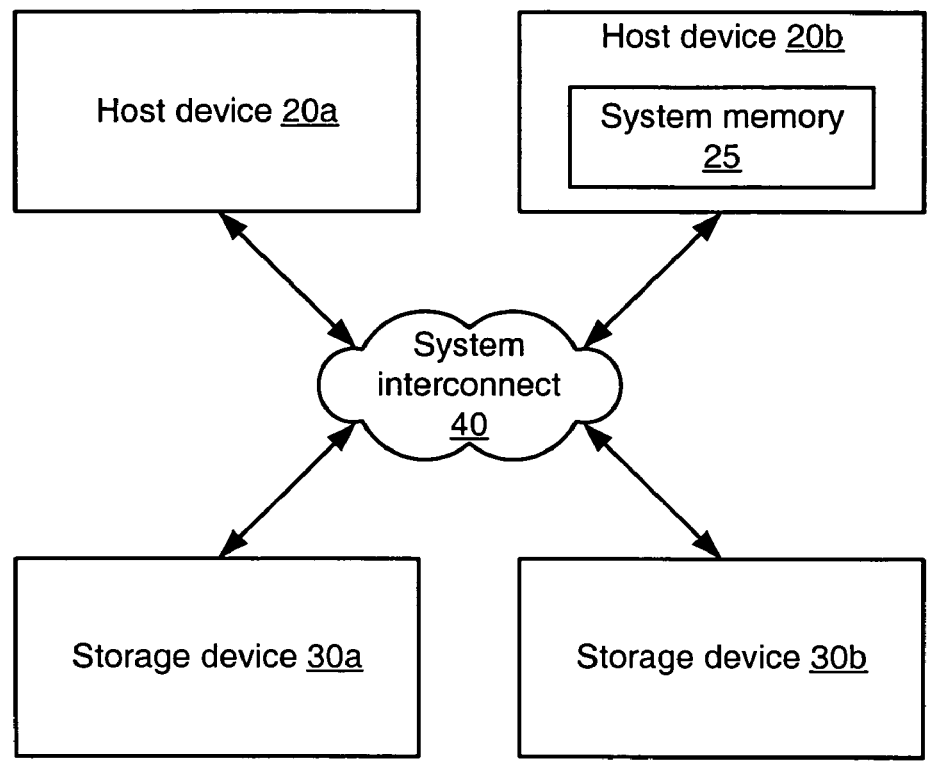
FIG. 1 is a block diagram illustrating one embodiment of a storage system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Computer System Overview

Turning now to FIG. 1, a block diagram of one embodiment of a computer system is shown. In the illustrated embodiment, system 10 includes a plurality of host devices 20a and 20b coupled to a plurality of storage devices 30a and 30b via a system interconnect 40. Further, host device 20b includes a system memory 25 in the illustrated embodiment. For simplicity of reference, elements referred to herein by a reference number followed by a letter may be referred to collectively by the reference number alone. For example, host devices 20a and 20b and storage devices 30a and 30b may be referred to collectively as host devices 20 and storage devices 30.

In various embodiments of system 10, host devices 20 may be configured to access data stored on one or more of storage devices 30. In one embodiment, system 10 may be implemented within a single computer system, for example as an integrated storage server. In such an embodiment, for example, host devices 20 may be individual processors, system memory 25 may be a cache memory such as a static RAM (SRAM), storage devices 30 may be mass storage devices such as hard disk drives or other writable or rewritable media, and system interconnect 40 may include a peripheral bus interconnect such as a Peripheral Component Interface (PCI) bus. In some such embodiments, system interconnect 40 may include several types of interconnect between host devices 20 and storage devices 30. For example, system interconnect 40 may include one or more processor buses (not shown) configured for coupling to host devices 20, one or more bus bridges (not shown) configured to couple the processor buses to one or more peripheral buses, and one or more storage device interfaces (not shown) configured to couple the peripheral buses to storage devices 30. Storage device interface types may in various embodiments include the Small Computer System Interface (SCSI), AT Attachment Packet Interface (ATAPI), Firewire, and/or Universal Serial Bus (USB), for example, although numerous alternative embodiments including other interface types are possible and contemplated.

In an embodiment of system 10 implemented within a single computer system, system 10 may be configured to provide most of the data storage requirements for one or more other computer systems (not shown), and may be configured to communicate with such other computer systems. In an alternative embodiment, system 10 may be configured as a distributed storage system, such as a storage area network (SAN), for example. In such an embodiment, for example, host devices 20 may be individual computer systems such as server systems, system memory 25 may be comprised of one or more types of dynamic RAM (DRAM), storage devices 30 may be standalone storage nodes each including one or more hard disk drives or other types of storage, and system interconnect 40 may be a communication network such as Ethernet or Fibre Channel. A distributed storage configuration of system 10 may facilitate scaling of storage system capacity as well as data bandwidth between host and storage devices.

In still another embodiment, system 10 may be configured as a hybrid storage system, where some storage devices 30 are integrated within the same computer system as some host devices 20, while other storage devices 30 are configured as standalone devices coupled across a network to other host devices 20. In such a hybrid storage system, system interconnect 40 may encompass a variety of interconnect mechanisms, such as the peripheral bus and network interconnect described above.

It is noted that although two host devices 20 and two storage devices 30 are illustrated in FIG. 1, it is contemplated that system 10 may have an arbitrary number of each of these types of devices in alternative embodiments. Also, in some embodiments of system 10, more than one instance of system memory 25 may be employed, for example in other host devices 20 or storage devices 30. Further, in some embodiments, a given system memory 25 may reside externally to host devices 20 and storage devices 30 and may be coupled directly to a given host device 20 or storage device 30 or indirectly through system interconnect 40.

In many embodiments of system 10, one or more host devices 20 may be configured to execute program instructions and to reference data, thereby performing a computational function. In some embodiments, system memory 25 may be one embodiment of a computer-accessible medium configured to store such program instructions and data. However, in other embodiments, program instructions and/or data may be received, sent or stored upon different types of computer-accessible media. Generally speaking, a computer-accessible medium may include storage media or memory media such as magnetic or optical media, e.g., disk or CD-ROM included in system 10 as storage devices 30. A computer-accessible medium may also include volatile or non-volatile media such as RAM (e.g. SDRAM, DDR SDRAM, RDRAM, SRAM, etc.), ROM, etc, that may be included in some embodiments of system 10 as system memory 25. Further, a computer-accessible medium may include transmission media or signals such as electrical, electromagnetic, or digital signals, conveyed via a communication medium such as network and/or a wireless link, which may be included in some embodiments of system 10 as system interconnect 40.

In some embodiments, program instructions and data stored within a computer-accessible medium as described above may implement an operating system that may in turn provide an environment for execution of various application programs. For example, a given host device 20 may be configured to execute a version of the Microsoft Windows operating system, the Unix/Linux operating system, the Apple Macintosh operating system, or another suitable operating system. Additionally, a given host device may be configured to execute application programs such as word processors, web browsers and/or servers, email clients and/or servers, and multimedia applications, among many other possible applications.

Figure 2:
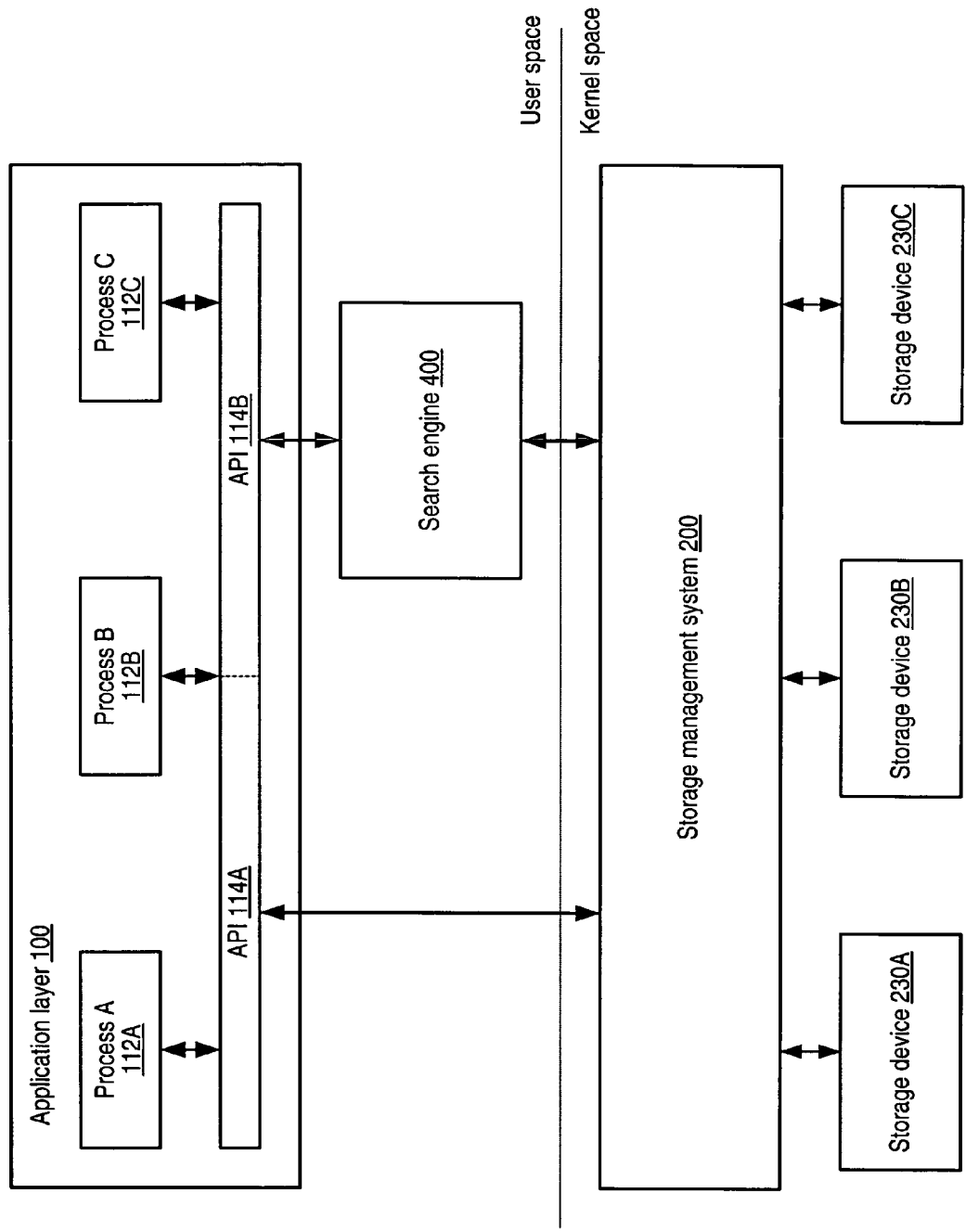
FIG. 2 is a block diagram illustrating one embodiment of a software-based storage system architecture and its interface to storage devices.

During execution on a given host device 20, either the operating system or a given application may generate requests for data to be loaded from or stored to a given storage device 30. For example, code corresponding to portions of the operating system or an application itself may be stored on a given storage device 30, so in response to invocation of the desired operation system routine or application program, the corresponding code may be retrieved for execution. Similarly, operating system or application execution may produce data to be stored In some embodiments, the movement and processing of data stored on storage devices 30 may be managed by a software-based storage management system. One such embodiment is illustrated in FIG. 2, which shows an application layer 100 interfacing to a plurality of storage devices 230A-C via a storage management system 200. Additionally, application layer 100 interfaces to a search engine 400, which in turn interfaces to storage management system 200. Some modules illustrated within FIG. 2 may be configured to execute in a user execution mode or "user space", while others may be configured to execute in a kernel execution mode or "kernel space." In the illustrated embodiment, application layer 100 includes a plurality of user space software processes 112A-C. Each process interfaces to kernel space storage management system 200 via an application programming interface (API) 114A. In turn, storage management system 200 interfaces to storage devices 230A-C. Additionally, each process interfaces to user space search engine 400 via an API 114B. The functionality associated with various embodiments of storage management system 200 and search engine 400 is described in greater detail below.

It is contemplated that in some embodiments, an arbitrary number of processes 112 and/or storage devices 230 may be implemented. In one embodiment, each of processes 112 may correspond to a given user application, and each may be configured to access storage devices 230A-C through calls to API 114A. APIs 114A-B provides processes 112 with access to various components of storage management system 200 and search engine 400. For example, in one embodiment APIs 114A-B may include function calls exposed by storage management system 200 or search engine 400 that a given process 112 may invoke, while in other embodiments APIs 114A-B may support other types of interprocess communication. In one embodiment, storage devices 230 may be illustrative of storage devices 30 of FIG. 1. Additionally, in one embodiment, any of the components of storage management system 200, search engine 400 and/or any of processes 112 may be configured to execute on one or more host devices 20 of FIG. 1, for example as program instructions and data stored within a computer-accessible medium such as system memory 25 of FIG. 1.

Storage Management System and File System

As just noted, in some embodiments storage management system 200 may provide data and control structures for organizing the storage space provided by storage devices 230 into files. In various embodiments, the data structures may include one or more tables, lists, or other records configured to store information such as, for example, the identity of each file, its location within storage devices 230 (e.g., a mapping to a particular physical location within a particular storage device), as well as other information about each file as described in greater detail below. Also, in various embodiments, the control structures may include executable routines for manipulating files, such as, for example, function calls for changing file identities and for modifying file content. Collectively, these data and control structures may be referred to herein as a file system, and the particular data formats and protocols implemented by a given file system may be referred to herein as the format of the file system.

In some embodiments, a file system may be integrated into an operating system such that any access to data stored on storage devices 230 is governed by the control and data structures of the file system. Different operating systems may implement different native file systems using different formats, but in some embodiments, a given operating system may include a file system that supports multiple different types of file system formats, including file system formats native to other operating systems. In such embodiments, the various file system formats supported by the file system may be referred to herein as local file systems. Additionally, in some embodiments, a file system may be implemented using multiple layers of functionality arranged in a hierarchy, as illustrated in FIG. 3.

Figure 3:
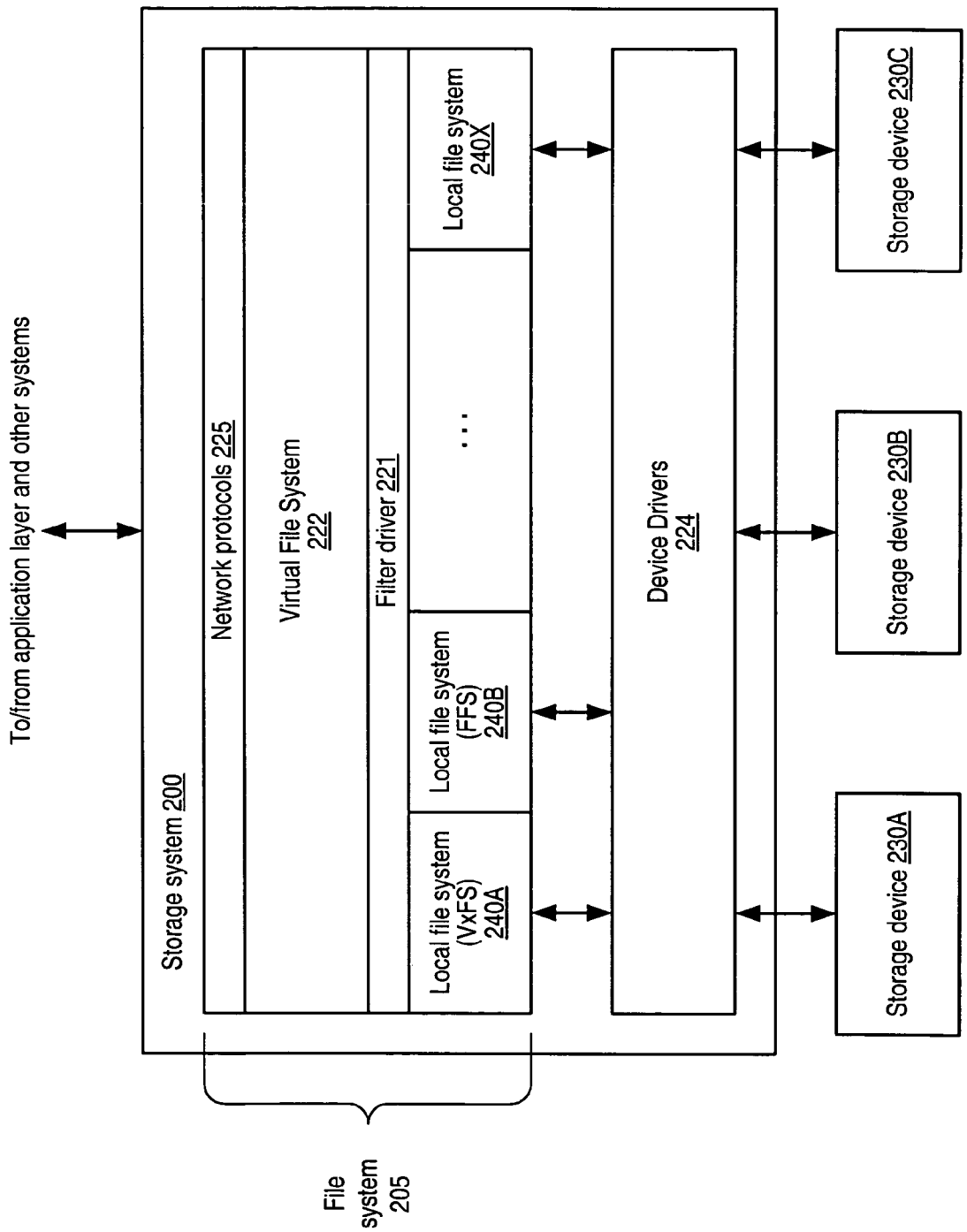
FIG. 3 is a block diagram illustrating one embodiment of a storage management system.

FIG. 3 illustrates one embodiment of storage management system 200. In the illustrated embodiment, storage management system includes a file system 205 configured to interface with one or more device drivers 224, which are in turn configured to interface with storage devices 230. As illustrated in FIG. 2, the components of storage management system 200 may be configured to execute in kernel space; however, it is contemplated that in some embodiments, some components of storage management system 200 may be configured to execute in user space. Also, in one embodiment, any of the components of storage management system 200 may be configured to execute on one or more host devices 20 of FIG. 1, for example as program instructions and data stored within a computer-accessible medium such as system memory 25 of FIG. 1.

As described above with respect to system 10 of FIG. 1, a given host device 20 may reside in a different computer system from a given storage device 30, and may access that storage device via a network. Likewise, with respect to storage management system 200, in one embodiment a given process such as process 112A may execute remotely and may access storage devices 230 over a network. In the illustrated embodiment, file system 205 includes network protocols 225 to support access to the file system by remote processes. In some embodiments, network protocols 225 may include support for the Network File System (NFS) protocol or the Common Internet File System (CIFS) protocol, for example, although it is contemplated that any suitable network protocol may be employed, and that multiple such protocols may be supported in some embodiments.

File system 205 may be configured to support a plurality of local file systems. In the illustrated embodiment, file system 205 includes a VERITAS (VxFS) format local file system 240A, a Berkeley fast file system (FFS) format local file system 240B, and a proprietary (X) format local file system 240X. However, it is contemplated that in other embodiments, any number or combination of local file system formats may be supported by file system 205. To provide a common interface to the various local file systems 240, file system 205 includes a virtual file system 222. In one embodiment, virtual file system 222 may be configured to translate file system operations originating from processes 112 to a format applicable to the particular local file system 240 targeted by each operation. Additionally, in the illustrated embodiment storage management system 200 includes device drivers 224 through which local file systems 240 may access storage devices 230. Device drivers 224 may implement data transfer protocols specific to the types of interfaces employed by storage devices 230. For example, in one embodiment device drivers 224 may provide support for transferring data across SCSI and ATAPI interfaces, though in other embodiments device drivers 224 may support other types and combinations of interfaces.

In the illustrated embodiment, file system 205 also includes filter driver 221. In some embodiments, filter driver 221 may be configured to monitor each operation entering file system 205 and, subsequent to detecting particular types of operations, to cause additional operations to be performed or to alter the behavior of the detected operation. For example, in one embodiment filter driver 221 may be configured to combine multiple write operations into a single write operation to improve file system performance. In another embodiment, filter driver 221 may be configured to compute a signature of a file subsequent to detecting a write to that file. In still another embodiment, filter driver 221 may be configured to store and/or publish information, such as records, associated with particular files subsequent to detecting certain kinds of operations on those files, as described in greater detail below. It is contemplated that in some embodiments, filter driver 221 may be configured to implement one or more combinations of the aforementioned operations, including other filter operations not specifically mentioned.

An embodiment of filter driver 221 that is configured to detect file system operations as they are requested or processed may be said to perform "in-band" detection of such operations. Alternatively, such detection may be referred to as being synchronous with respect to occurrence of the detected operation or event. In some embodiments, a processing action taken in response to in-band detection of an operation may affect how the operation is completed. For example, in-band detection of a file read operation might result in cancellation of the operation if the source of the operation is not sufficiently privileged to access the requested file. In some embodiments, in-band detection of an operation may not lead to any effect on the completion of the operation itself, but may spawn an additional operation, such as to record the occurrence of the detected operation in a metadata record as described below.

By contrast, a file system operation or event may be detected subsequent to its occurrence, such that detection may occur after the operation or event has already completed. Such detection may be referred to as "out of band" or asynchronous with respect to the detected operation or event. For example, a user process 112 may periodically check a file to determine its length. The file length may have changed at any time since the last check by user process 112, but the check may be out of band with respect to the operation that changed the file length. In some instances, it is possible for out of band detection to fail to detect certain events. Referring to the previous example, the file length may have changed several times since the last check by user process 112, but only the last change may be detected.

It is noted that although an operation or event may be detected in-band, an action taken in response to such detection may occur either before or after the detected operation completes. Referring to the previous example, in one embodiment each operation to modify the length of the checked file may be detected in-band and recorded. User process 112 may be configured to periodically inspect the records to determine the file length. Because length-modifying operations were detected and recorded in-band, user process 112 may take each such operation into account, even though it may be doing so well after the occurrence of these operations.

It is noted that filter driver 221 is part of file system 205 and not an application or process within user space 210. Consequently, filter driver 221 may be configured to operate independently of applications and processes within the user space 210. Alternatively, or in addition to the above, filter driver 221 may be configured to perform operations in response to requests received from applications or processes within the user space 210.

It is further noted that in some embodiments, kernel space 220 may include processes (not shown) that generate accesses to storage devices 230, similar to user space processes 112. In such embodiments, processes executing in kernel space 220 may be configured to access file system 205 through a kernel-mode API (not shown), in a manner similar to user space processes 112. Thus, in some embodiments, all accesses to storage devices 230 may be processed by file system 205, regardless of the type or space of the process originating the access operation.

Numerous alternative embodiments of storage management system 200 and file system 205 are possible and contemplated. For example, file system 205 may support different numbers and formats of local file systems 240, or only a single local file system 240. In some embodiments, network protocol 225 may be omitted or integrated into a portion of storage management system 200 external to file system 205. Likewise, in some embodiments virtual file system 222 may be omitted or disabled, for example if only a single local file system 240 is in use. Additionally, in some embodiments filter driver 221 may be implemented within a different layer of file system 205. For example, in one embodiment, filter driver 221 may be integrated into virtual file system 222, while in another embodiment, an instance of filter driver 221 may be implemented in each of local file systems 240.

Files and Metadata

As described above, file system 205 may be configured to manage access to data stored on storage devices 230, for example as a plurality of files stored on storage devices 230. In many embodiments, each stored file may have an associated identity used by the file system to distinguish each file from other files. In one embodiment of file system 205, the identity of a file may be a file name, which may for example include a string of characters such as "filename.txt". However, in embodiments of file system 205 that implement a file hierarchy, such as a hierarchy of folders or directories, all or part of the file hierarchy may be included in the file identity. For example, a given file named "file1.txt" may reside in a directory "smith" that in turn resides in a directory "users". The directory "users" may reside in a directory "test1" that is a top-level or root-level directory within file system 205. In some embodiments, file system 205 may define a single "root directory" to include all root-level directories, where no higher-level directory includes the root directory. In other embodiments, multiple top-level directories may coexist such that no higher-level directory includes any top-level directory. The names of the specific folders or directories in which a given file is located may be referred to herein as the given file's path or path name.

In some embodiments of file system 205 that implement a file hierarchy, a given file's identity may be specified by listing each directory in the path of the file as well as the file name. Referring to the example given above, the identity of the given instance of the file named "file1.txt" may be specified as "/test1/users/smith/file1.txt". It is noted that in some embodiments of file system 205, a file name alone may be insufficient to uniquely identify a given file, whereas a fully specified file identity including path information may be sufficient to uniquely identify a given file. There may, for example, exist a file identified as "/test2/users/smith/file1.txt" that, despite sharing the same file name as the previously mentioned file, is distinct by virtue of its path. It is noted that other methods of representing a given file identity using path and file name information are possible and contemplated. For example, different characters may be used to delimit directory/folder names and file names, or the directory/folder names and file names may be specified in a different order.

The files managed by file system 205 may store application data or program information, which may collectively be referred to as file data, in any of a number of encoding formats. For example, a given file may store plain text in an ASCII-encoded format or data in a proprietary application format, such as a particular word processor or spreadsheet encoding format. Additionally, a given file may store video or audio data or executable program instructions in a binary format. It is contemplated that numerous other types of data and encoding formats, as well as combinations of data and encoding formats, may be used in files as file data.

In addition to managing access to storage devices, the various files stored on storage devices, and the file data in those files as described above, in some embodiments file system 205 may be configured to store information corresponding to one or more given files, which information may be referred to herein as metadata. Generally speaking, metadata may encompass any type of information associated with a file. In various embodiments, metadata may include information such as (but not limited to) the file identity, size, ownership, and file access permissions. Metadata may also include free-form or user-defined data such as records corresponding to file system operations, as described in greater detail below. In some embodiments, the information included in metadata may be predefined (i.e., hardcoded) into file system 205, for example as a collection of metadata types defined by a vendor or integrator of file system 205. In other embodiments, file system 205 may be configured to generate new types of metadata definitions during operation. In still other embodiments, one or more application processes 112 external to file system 205 may define new metadata to be managed by file system 205, for example via an instance of API 114 defined for that purpose. It is contemplated that combinations of such techniques of defining metadata may be employed in some embodiments. Metadata corresponding to files (however the metadata is defined) as well as the data content of files may collectively be referred to herein as file system content.

Figure 4:
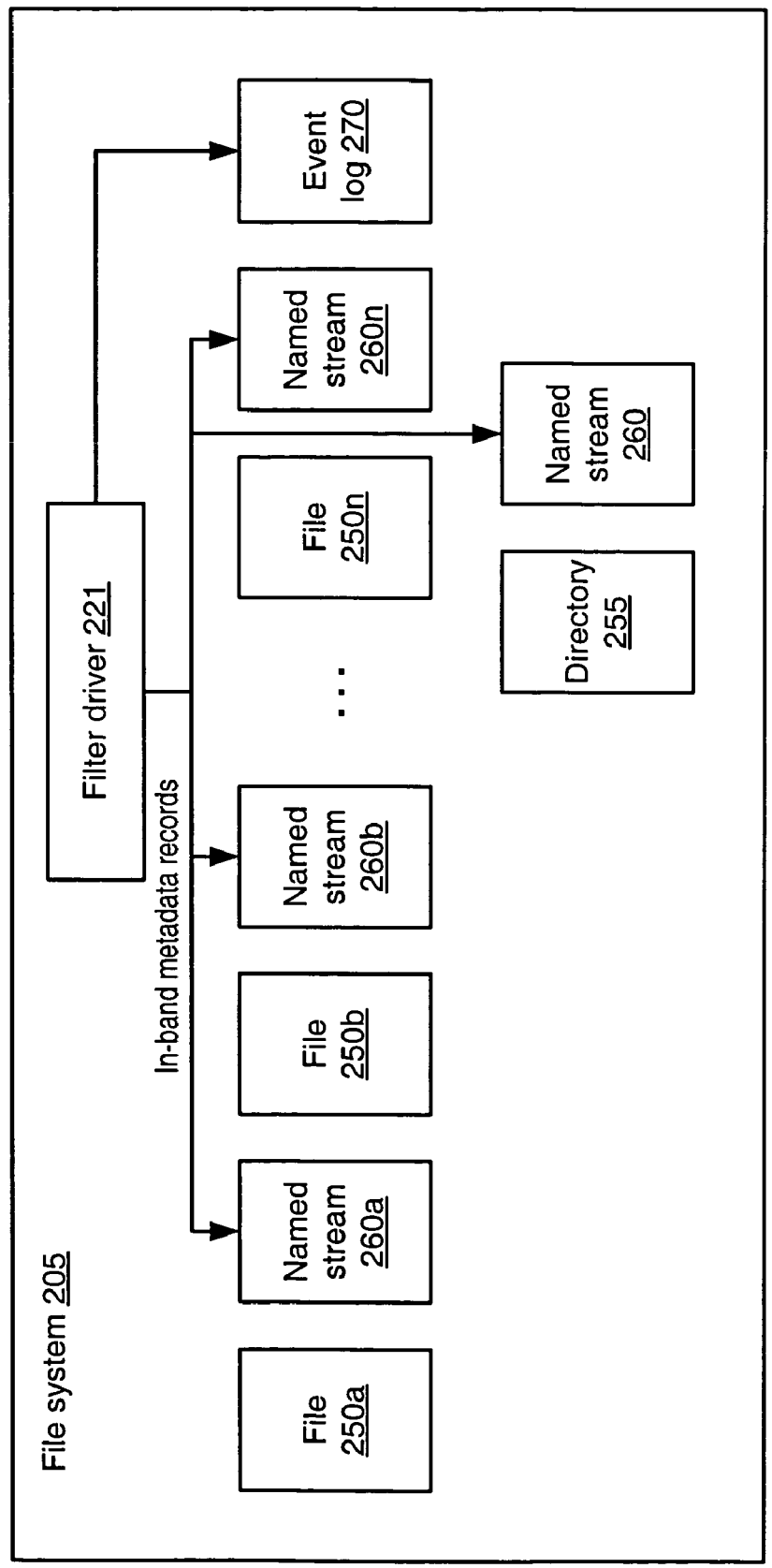
FIG. 4 is a block diagram illustrating one embodiment of a file system configured to store files and associated metadata.

FIG. 4 illustrates one embodiment of a file system configured to store files and associated metadata (i.e., to store file system content). The embodiment of file system 205 shown in FIG. 4 may include those elements illustrated in the embodiment of FIG. 3; however, for sake of clarity, some of these elements are not shown. In the illustrated embodiment, file system 205 includes filter driver 221, an arbitrary number of files 250a-n, a directory 255, a respective named stream 260a-n associated with each of files 250a-n, a respective named stream 260 associated with directory 255, and an event log 270. It is noted that a generic instance of one of files 250a-n or named streams 260a-n may be referred to respectively as a file 250 or a named stream 260, and that files 250a-n and named streams 260a-n may be referred to collectively as files 250 and named streams 260, respectively. As noted above, files 250 and named streams 260 may collectively be referred to as file system content. In some embodiments, directory 255 may also be included as part of file system content.

Files 250 may be representative of files managed by file system 205, and may in various embodiments be configured to store various types of data and program instructions as described above. In hierarchical implementations of file system 205, one or more files 250 may be included in a directory 255 (which may also be referred to as a folder). In various embodiments, an arbitrary number of directories 255 may be provided, and some directories 255 may be configured to hierarchically include other directories 255 as well as files 250. In the illustrated embodiment, each of files 250 and directory 255 has a corresponding named stream 260. Each of named streams 260 may be configured to store metadata pertaining to its corresponding file. It is noted that files 250, directory 255 and named streams 260 may be physically stored on one or more storage devices, such as storage devices 230 of FIG. 2. However, for purposes of illustration, files 250, directory 255 and named streams 260 are shown as conceptually residing within file system 205. Also, it is contemplated that in some embodiments directory 255 may be analogous to files 250 from the perspective of metadata generation, and it is understood that in such embodiments, references to files 250 in the following discussion may also apply to directory 255.

In some embodiments, filter driver 221 may be configured to access file data stored in a given file 250. For example, filter driver 221 may be configured to detect read and/or write operations received by file system 205, and may responsively cause file data to be read from or written to a given file 250 corresponding to the received operation. In some embodiments, filter driver 221 may be configured to generate in-band metadata corresponding to a given file 250 and to store the generated metadata in the corresponding named stream 260. For example, upon detecting a file write operation directed to given file 250, filter driver 221 may be configured to update metadata corresponding to the last modified time of given file 250 and to store the updated metadata within named stream 260. Also, in some embodiments filter driver 221 may be configured to retrieve metadata corresponding to a specified file on behalf of a particular application.

Metadata may be generated in response to various types of file system activity initiated by processes 112 of FIG. 2. In some embodiments, the generated metadata may include records of arbitrary complexity. For example, in one embodiment filter driver 221 may be configured to detect various types of file manipulation operations such as file create, delete, rename, and/or copy operations as well as file read and write operations. In some embodiments, such operations may be detected in-band as described above. After detecting a particular file operation, filter driver 221 may be configured to generate a record of the operation and store the record in the appropriate named stream 260 as metadata of the file 250 targeted by the operation.

More generally, any operation that accesses any aspect of file system content, such as, for example, reading or writing of file data or metadata, or any or the file manipulation operations previously mentioned, may be referred to as a file system content access event. In one embodiment, filter driver 221 may be configured to generate a metadata record in response to detecting a file system content access event. It is contemplated that in some embodiments, access events targeting metadata may themselves generate additional metadata. As described in greater detail below, in the illustrated embodiment, event log 270 may be configured to store records of detected file system content access events independently of whether additional metadata is stored in a particular named stream 260 in response to event detection.

The stored metadata record may in various embodiments include various kinds of information about the file 250 and the operation detected, such as the identity of the process generating the operation, file identity, file type, file size, file owner, and/or file permissions, for example. In one embodiment, the record may include a file signature indicative of the content of file 250. A file signature may be a hash-type function of all or a portion of the file contents and may have the property that minor differences in file content yield quantifiably distinct file signatures. For example, the file signature may employ the Message Digest 5 (MD5) algorithm, which may yield different signatures for files differing in content by as little as a single bit, although it is contemplated that any suitable signature-generating algorithm may be employed. The record may also include additional information other than or instead of that previously described.

In one embodiment, the metadata record stored by filter driver 221 subsequent to detecting a particular file operation may be generated and stored in a format that may include data fields along with tags that describe the significance of an associated data field. Such a format may be referred to as a "self-describing" data format. For example, a data element within a metadata record may be delimited by such tag fields, with the generic syntax:

<descriptive_tag>data element</descriptive_tag> where the "descriptive_tag" delimiter may describe some aspect of the "data element" field, and may thereby serve to structure the various data elements within a metadata record. It is contemplated that in various embodiments, self-describing data formats may employ any of a variety of syntaxes, which may include different conventions for distinguishing tags from data elements.

Self-describing data formats may also be extensible, in some embodiments. That is, the data format may be extended to encompass additional structural elements as required. For example, a non-extensible format may specify a fixed structure to which data elements must conform, such as a tabular row-and-column data format or a format in which the number and kind of tag fields is fixed. By contrast, in one embodiment, an extensible, self-describing data format may allow for an arbitrary number of arbitrarily defined tag fields used to delimit and structure data. In another embodiment, an extensible, self-describing data format may allow for modification of the syntax used to specify a given data element. In some embodiments, an extensible, self-describing data format may be extended by a user or an application while the data is being generated or used.

In one embodiment, Extensible Markup Language (XML) format, or any data format compliant with any version of XML, may be used as an extensible, self-describing format for storing metadata records, although it is contemplated that in other embodiments, any suitable format may be used, including formats that are not extensible or self-describing. XML-format records may allow arbitrary definition of record fields, according to the desired metadata to be recorded. One example of an XML-format record is as follows:

```
<record sequence="1">
    <path>/test1/foo.pdf</path>
    <type>application/pdf</type>
    <user id=1598>username</user>
    <group id=119>groupname</group>
    <perm>rw-r--r--</perm>
    <md5>d41d8cd98f00b204e9800998ecf8427e</md5>
    <size>0</size>
</record>
```

Such a record may be appended to the named stream (for example, named stream 260a) associated with the file (for example, file 250a) having the file identity "/test1/foo.pdf" subsequent to, for example, a file create operation. In this case, the number associated with the "record sequence" field indicates that this record is the first record associated with file 250a. The "path" field includes the file identity, and the "type" field indicates the file type, which in one embodiment may be provided by the process issuing the file create operation, and in other embodiments may be determined from the extension of the file name or from header information within the file, for example. The "user id" field records both the numerical user id and the textual user name of the user associated with the process issuing the file create operation, and the "group id" field records both the numerical group id and the textual group name of that user. The "perm" field records file permissions associated with file 250a in a format specific to the file system 205 and/or the operating system. The "md5" field records an MD5 signature corresponding to the file contents, and the "size" field records the length of file 250a in bytes. It is contemplated that in alternative embodiments, filter driver 221 may store records corresponding to detected operations where the records include more or fewer fields, as well as fields having different definitions and content. It is also contemplated that in some embodiments filter driver 221 may encapsulate data read from a given file 250 within the XML format, such that read operations to files may return XML data regardless of the underlying file data format. Likewise, in some embodiments filter driver 221 may be configured to receive XML format data to be written to a given file 250. In such an embodiment, filter driver 221 may be configured to remove XML formatting prior to writing the file data to given file 250.

It is noted that in some embodiments, metadata may be stored in a structure other than a named stream. For example, in one embodiment metadata corresponding to one or more files may be stored in another file in a database format or another format. Also, it is contemplated that in some embodiments, other software modules or components of file system 205 may be configured to generate, store, and/or retrieve metadata. For example, the metadata function of filter driver 221 may be incorporated into or duplicated by another software module.

In the illustrated embodiment, file system 205 includes event log 270. Event log 270 may be a named stream similar to named streams 260; however, rather than being associated with a particular file, event log 270 may be associated directly with file system 205. In some embodiments, file system 205 may include only one event log 270, while in other embodiments, more than one event log 270 may be provided. For example, in one embodiment of file system 205 including a plurality of local file systems 240 as illustrated in FIG. 2, one history stream per local file system 240 may be provided.

In some embodiments, filter driver 221 may be configured to store a metadata record in event log 270 in response to detecting a file system operation or event. For example, a read or write operation directed to a particular file 250 may be detected, and subsequently filter driver 221 may store a record indicative of the operation in event log 270. In some embodiments, filter driver 221 may be configured to store metadata records within event log 270 regardless of whether a corresponding metadata record was also stored within a named stream 260. In some embodiments event log 270 may function as a centralized history of all detected operations and events transpiring within file system 205.

Similar to the records stored within named stream 260, the record stored by filter driver 221 in event log 270 may in one embodiment be generated in an extensible, self-describing data format such as the Extensible Markup Language (XML) format, although it is contemplated that in other embodiments, any suitable format may be used. As an example, a given file 250a named "/test1/foo.pdf" may be created, modified, and then renamed to file 250b "/test1/destination.pdf" in the course of operation of file system 205. In one embodiment, event log 270 may include the following example records subsequent to the rename operation:

```
<record>
    <op>create</op>
    <path>/test1/foo.pdf</path>
</record>
<record>
    <op>modify</op>
    <path>/test1/foo.pdf</path>
</record>
<record>
    <op>rename</op>
    <path>/test1/destination.pdf</path>
    <oldpath>/test1/foo.pdf</oldpath>
</record>
```

In this example, the "op" field of each record indicates the operation performed, while the "path" field indicates the file identity of the file 250a operated on. In the case of the file rename operation, the "path" field indicates the file identity of the destination file 250b of the rename operation, and the "oldpath" field indicates the file identity of the source file 250a. It is contemplated that in alternative embodiments, filter driver 221 may store within event log 270 records including more or fewer fields, as well as fields having different definitions and content.

Searching and Indexing File System Content

The file system content stored and managed by file system 205 may be accessed, for example by processes 112, in a number of different ways. As shown in FIG. 2, processes 112 may interact directly with storage management system 200 via API 114A. For example, if a process 112 knows the specific identity of a file 250 it wishes to access, it may directly open and read that file 250 via API calls provided by storage management system 200. However, in some embodiments processes 112 may desire to access file system content according to a particular criterion or set of criteria. For example, a given process 112 may be interested in identifying those files 250 that include a particular text string.

In the embodiment illustrated in FIG. 2, search engine 400 may be configured to search file system content on behalf of processes 112 and to identify content that matches specified criteria. For example, in one embodiment search engine 400 may be configured to search files 250 for text patterns or regular expressions specified by processes 112 requesting searches. If a portion of given file 250 matches a text pattern or regular expression specified for a given search, search engine 400 may include file 250 in a search result set corresponding to the given search. In some embodiments, search engine 400 may be configured to perform searches that specify a combination of terms or patterns joined with Boolean or other predicates, such as AND, OR, NOT, or NEAR. For example, a search for files satisfying the search pattern ("quarterly report" AND "FY 2003") may return a result set including the names of those files 250 including both text strings. In various embodiments, search engine 400 may provide other features or predicates to qualify pattern matching, or may implement a query language such as a version of Structured Query Language (SQL), Extensible Markup Language (XML) Query Language (XQuery), or another suitable query language. In some embodiments, metadata corresponding to files 250 as well as the data content of files 250 may be searched.

In performing a search, search engine 400 may be configured to directly access all file system content stored by file system 205. However, if the amount of content stored is substantial, performing a brute-force search on all file system content may result in poor search performance. In some embodiments, search performance may be improved by creating one or more indexes of file system content and using these indexes to assist in evaluation of particular searches.

Generally speaking, an index may be any data structure that organizes a collection of data according to some aspect or attribute, facilitating searching of the data by the indexed aspect or attribute. For example, in one embodiment an index may be a list of names of all files 250 defined with file system 205, organized alphabetically. In some embodiments, multiple indexes of file system content may be employed. For example, if file system content is frequently searched for specific text patterns or file attributes (such as, e.g., file name, associated user, and content creation/modification time), individual indexes that sort or organize file system content by each of these patterns or attributes may be created. In some embodiments, more complex indexing schemes may be employed, including indexes that combine multiple content attributes into complex state spaces. Additionally, it is contemplated that indexes may be implemented using any suitable data structure, including lists, tables, trees, and higher-order data structures. Any information stored by an index of file system content may be generically referred to as index information, and index information extracted by or derived from file system content during the indexing process may be said to be associated with that file system content. For example, the aforementioned indexing patterns or attributes, to the extent they occur in a given file 250, may comprise index information associated with that given file. In some embodiments, only the content of files 250 may be indexed, while in other embodiments, metadata associated with files 250 (and stored, for example, in named streams 260) may be indexed along with file content.

If a file 250 is modified, previously determined index information associated with the file may become out of date. For example, a file 250 may be altered to add or remove a pattern that search engine 400 is configured to index on. To maintain the currency of index information, it may be updated from time to time, for example in response to modification of various files 250. However, if a given file 250 is relatively large and the modifications to it are made to relatively small portions, the majority of given file 250 may remain unchanged. Consequently, if index information for the whole of given file 250 is regenerated, much of the regenerated index information may be unchanged. Redundantly regenerating index information may result in wasted processing resources, which in turn may possibly degrade system performance.

Figure 5:
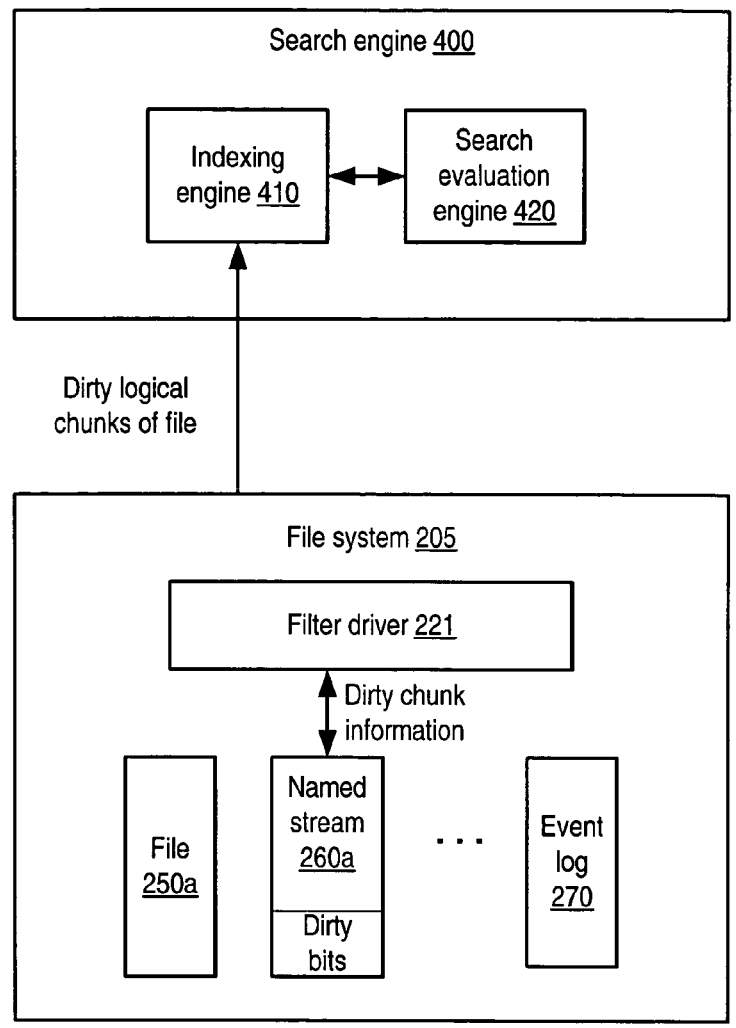
FIG. 5 is a block diagram illustrating one embodiment of a system configured to perform chunk-based indexing.

One embodiment of a system configured to perform chunk-based indexing is illustrated in FIG. 5. In the illustrated embodiment, search engine 400 includes an indexing engine 410 configured to interface with file system 205 to transfer information, as well as a search evaluation engine 420. It is noted that although only file 250a and named stream 260a are shown within file system 205, it is contemplated that file system 205 may include arbitrary numbers of files 250 and named streams 260 in addition to other elements, as described above in conjunction with the description of FIG. 4. It is also noted that while specific types of information exchange are illustrated between search engine 400 and file system 205, other types of information exchange may take place within these entities as well as between these entities and other entities not shown. Additionally, in some embodiments, the functions of indexing engine 410 and search evaluation engine 420 may be provided by a single software module or distributed among a group of other software modules.

In the illustrated embodiment, file system 205 may be configured to partition a given file 250 into a plurality of portions, which may also be referred to as logical chunks. In one embodiment, file system 205 may be configured to partition files 250 into logical chunks of a fixed, uniform size. For example, files 250 may be partitioned into logical chunks of 64 megabytes (MB) each, or any other suitable size. In some instances, the final chunk of a file may not contain exactly 64 MB of data; in various embodiments, the final chunk may be padded to 64 MB (for example, using whitespace or null characters) or truncated to its exact length. As an alternative to fixed-size chunks, in some embodiments file system 205 may be configured to partition a given file 250 dependent upon the content of file 250, which may result in logical chunks that vary in size. For example, where a chunk boundary based on a fixed chunk size falls in the middle of a word or within a record including structured data (such as an XML record), file system 205 may adjust the chunk boundary to the nearest whitespace character or acceptable record boundary. As another example of content-dependent partitioning, file system 205 may also be configured in some embodiments to partition a file 250 into possibly variable-size chunks according to the structure of content within the file. For example, a given file 250 may contain a document divided into sections, such as chapters, worksheets, etc. File system 205 may be configured to partition given file 250 into chunks according to such document divisions.

It is contemplated that in some embodiments, a single partitioning scheme may be employed for all files 250 by file system 205, whereas in other embodiments, file system 205 may be configured to employ different types of file partitioning schemes for different ones of files 250. In one embodiment, details regarding how a given file 250 is partitioned into logical chunks may be stored in corresponding named stream 260. For example, named stream 260 may include an indication of the chunk size, if fixed and uniform, or may indicate the sizes or offsets of the various chunks of given file 250, relative to byte locations, block locations, or other abstract locations within the file (such as section boundaries, for example). In some embodiments, chunk partitioning details may be stored in a data structure other than a named stream.

In one embodiment, indexing engine 410 may be configured to construct one or more indexes of file system content, which may include generating respective index information associated with the logical chunks into which a given file 250 has been partitioned, such as by file system 205 as just described. For example, for a given logical chunk of given file 250, indexing engine 410 may be configured to construct data structures such as tables or lists including indexing information, and may store such data structures internally or may coordinate to store them via file system 205.

In some embodiments, indexing engine 410 may be configured to index each logical chunk of a given file 250 as a separate individual document or entity. In one embodiment, in order to distinguish logical chunks of given file 250 to indexing engine 410, file system 205 may be configured to append chunk-identifying information to the file name and path name associated with given file 250 before conveying the logical chunk to indexing engine 410 for indexing. For example, in one embodiment filter driver 221 may be configured to determine the chunk boundaries of a file "/test1/foo.pdf". Filter driver 221 may also be configured to identify each chunk using the format "filename.chunk#", e.g., "/test1/foo.pdf.0", "/test1/foo.pdf.1", etc. Indexing engine 410 may be configured to index each chunk as an individual document having the name generated by file system 205.

Other chunk identification schemes are possible and contemplated. For example, in one embodiment file system 205 may be configured to assign a file ID to given file 250, which may be stored, for example, as metadata in a corresponding named stream 260. Generally speaking, a file ID may have the property that each file ID corresponds to only one file 250 within file system 205, and vice versa. A file ID assigned to a given file 250 may remain constant while given file 250 continues to exist, regardless of whether given file 250 is moved or renamed within file system 205. In such an embodiment, file system 205 may be configured to incorporate a file ID into the chunk-identifying information described above. For example, in one embodiment filter driver 221 may be configured to identify each chunk of given file 250 using the format "filename.fileID.chunk#". In some embodiments, if a reverse-mapping feature to generate a file name corresponding to a given file ID is provided, indexing engine 410 may be configured to ignore the file name included in a given chunk identifier and rely instead on the file ID. It is noted that in other embodiments, any suitable chunk identification scheme may be employed, regardless of specific lexical format or convention.

Search evaluation engine 420 may be configured to evaluate searches with respect to file system content and to return search results to requesting processes or applications. For example, search evaluation engine 420 may be configured to parse a given search string or pattern, to consult indexes made available by indexing engine 410 in order to quickly identify file system content satisfying the given search pattern, and to provide the names of files 250 satisfying the given search pattern. Where indexing engine 410 is configured to separately index logical chunks of a given file 250 as described above, it is possible that a particular search operation may result in multiple matching documents according to indexing engine 410, where some of the documents may correspond to chunks of the same file. For example, the search pattern "education" may appear in documents "/test1/planning.txt.4", "/user/smith/review.pdf.2" and "/user/smith/review.pdf.13", of which the latter two documents correspond to chunks of the same file. In some embodiments, search evaluation engine 420 may be configured to consolidate search results so that results corresponding to chunks of the same file 250 are reported as a single search result indicating that file 250. For example, search evaluation engine 420 may be configured to use the path and file name information included in the logical chunk identifier (or alternatively, unique file ID information included in the chunk identifier, if provided) to prevent duplicate reporting of a given file in search results.

Figure 6:
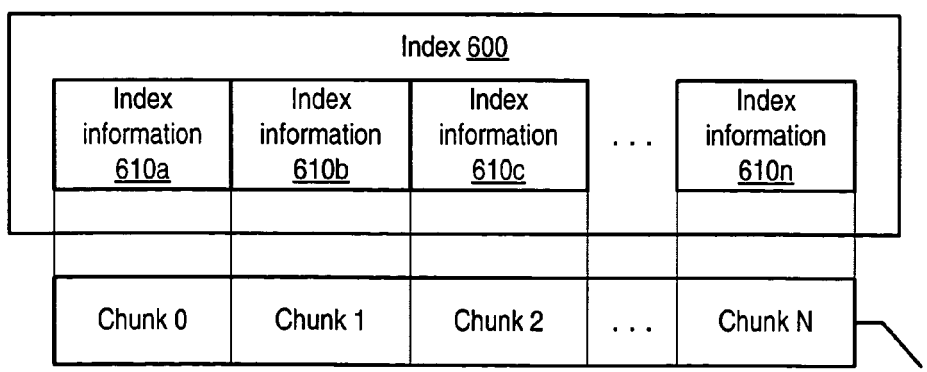
FIG. 6 is a block diagram illustrating one exemplary embodiment of correspondence between logical chunks of a file and respective index information.

One exemplary embodiment illustrating the correspondence of logical chunks of a file and respective index information is shown in FIG. 6. In the illustrated embodiment, a given file 250 includes a plurality of logical chunks denoted chunk 0 through chunk N. As described previously, the logical chunks may be of a fixed, uniform size or may vary in size, and given file 250 may include an arbitrary number of logical chunks.

In the illustrated embodiment, index 600 includes respective index information 610a-n corresponding to each of chunks 0-N of file 250. Index 600 may be one of several indexes constructed and maintained by indexing engine 410, and each instance of index information 610 may include the index information corresponding to a respective logical chunk. As described above, in some embodiments each instance of index information 610 may be generated by indexing each logical chunk of file 250 as a separate document.

Content Modification and Index Information Regeneration

During the course of operation of file system 205, an operation to modify a given file 250 may occur. Such an operation may include, for example, a file write or truncate operation, or any other type of operation on a file 250 that results in an alteration of the contents of file 250. (In some embodiments, an operation that results in modification of metadata associated with a given file 250 may also be considered a file-modifying operation.) As a result of file-modifying operations, previously generated index information associated with one or more logical chunks of given file 250 may no longer be consistent with the current state of the corresponding logical chunk(s). For example, a search pattern previously indexed by indexing engine 410 may be deleted from or added to a given logical chunk.

To restore consistency between the indexes maintained by indexing engine 410 and the content of a modified file 250, index information associated with the file may be regenerated. However, in embodiments where file system 205 is configured to partition files 250 into logical chunks, it may be the case that not every logical chunk of a given file 250 may be modified as a result of an operation that modifies given file 250. It may not be necessary to regenerate index information for unmodified logical chunks; in fact, in some instances, such redundant regeneration may waste computational resources and degrade overall system performance.

In the embodiment shown in FIG. 5, file system 205 may be configured to identify the chunks of given file 250 that are modified as a result of an operation to modify given file 250. For example, in one embodiment file system 205 may provide a block-based interface for processes 112 to access files 250, in which files appear to accessing processes as sequences of data blocks of a given size (e.g., 512 or 1024 bytes). In such an embodiment, filter driver 221 may receive a file write operation that specifies that one or more particular blocks, or a range of blocks, are to be written to given file 250. Responsively, filter driver 221 may be configured to identify which logical chunk or chunks of given file 250 are modified as a result of the write operation. For example, filter driver 221 may access corresponding named stream 260 to determine where the logical chunk boundaries of given file 250 are located; alternatively, chunk boundary information may be coded within filter driver 221 itself (e.g., in embodiments where chunk size is fixed and uniform across all files 250). With information on logical chunk boundaries, filter driver 221 may be configured to identify which logical chunks are modified as a result of writing specific blocks of given file 250. In other embodiments, it is contemplated that file system 205 may identify modified chunks of given file 250 in different ways. For example, such identification may occur out-of-band in a module other than filter driver 221. Further, interfaces other than block-based interfaces may be provided to processes 112. For example, in one embodiment file system 205 may provide a logical-chunk-based interface or a raw byte-stream interface to processes 112.

In some embodiments, file system 205 may be configured to associate a respective modification identifier with each of the logical chunks of a given file 250, and may assert a particular modification identifier in response to modifying a corresponding logical chunk of given file 250. Generally speaking, a modification identifier may be any data structure configured to indicate modification status of a given logical chunk. In the illustrated embodiment, the modification identifiers are configured as respective "dirty bits" corresponding to each logical chunk, and named stream 260 may be configured to store a string or vector of dirty bits corresponding to the logical chunks of given file 250. In one embodiment, filter driver 221 or another component of file system 205 may be configured to assert a dirty bit in response to identifying that a corresponding logical chunk is modified. In other embodiments, different data structures may be used as modification identifiers, and modification identifiers may be stored differently. For example, in one embodiment the modification identifier may be a more complex XML record stored within named stream 260 for each logical chunk of given file 250. Such a record may include structured data indicating chunk modification status, and possibly other information such as, for example, chunk modification frequency or a last modification time of the chunk.

Indexing engine 410 may be configured to regenerate index information for those logical chunks identified as modified by file system 205. In various embodiments, such regeneration may be initiated in response to different criteria. For example, in one embodiment, search engine 400 may be configured to scan file system 205 at intervals of time (such as every few minutes, hourly, daily, etc.) in order to identify logical chunks for which index information may need to be regenerated, for example by examining corresponding modification identifiers. Such scanning may occur independently of any specific file system content access events. In another embodiment, search engine 400 may monitor file system content access events, for example such as may be recorded in event log 270 as described above, and may initiate indexing upon detecting certain events. In still another embodiment, file system 205 may be configured to directly notify search engine 400 upon identifying one or more modified chunks.

Regardless of how search engine 400 is notified of modified logical chunks, indexing engine 410 may be configured to regenerate index information associated with a given logical chunk dependent upon that chunk's modification identifier. For example, in one embodiment indexing engine 410 may regenerate index information for logical chunks having an asserted dirty bit while skipping index information regeneration for logical chunks having a deasserted dirty bit. In some embodiments, indexing engine 410 may be configured to deassert a previously-asserted modification identifier following regeneration of index information for the corresponding logical chunk, for example by indicating to filter driver 221 that the chunk is no longer dirty.

Figure 7:
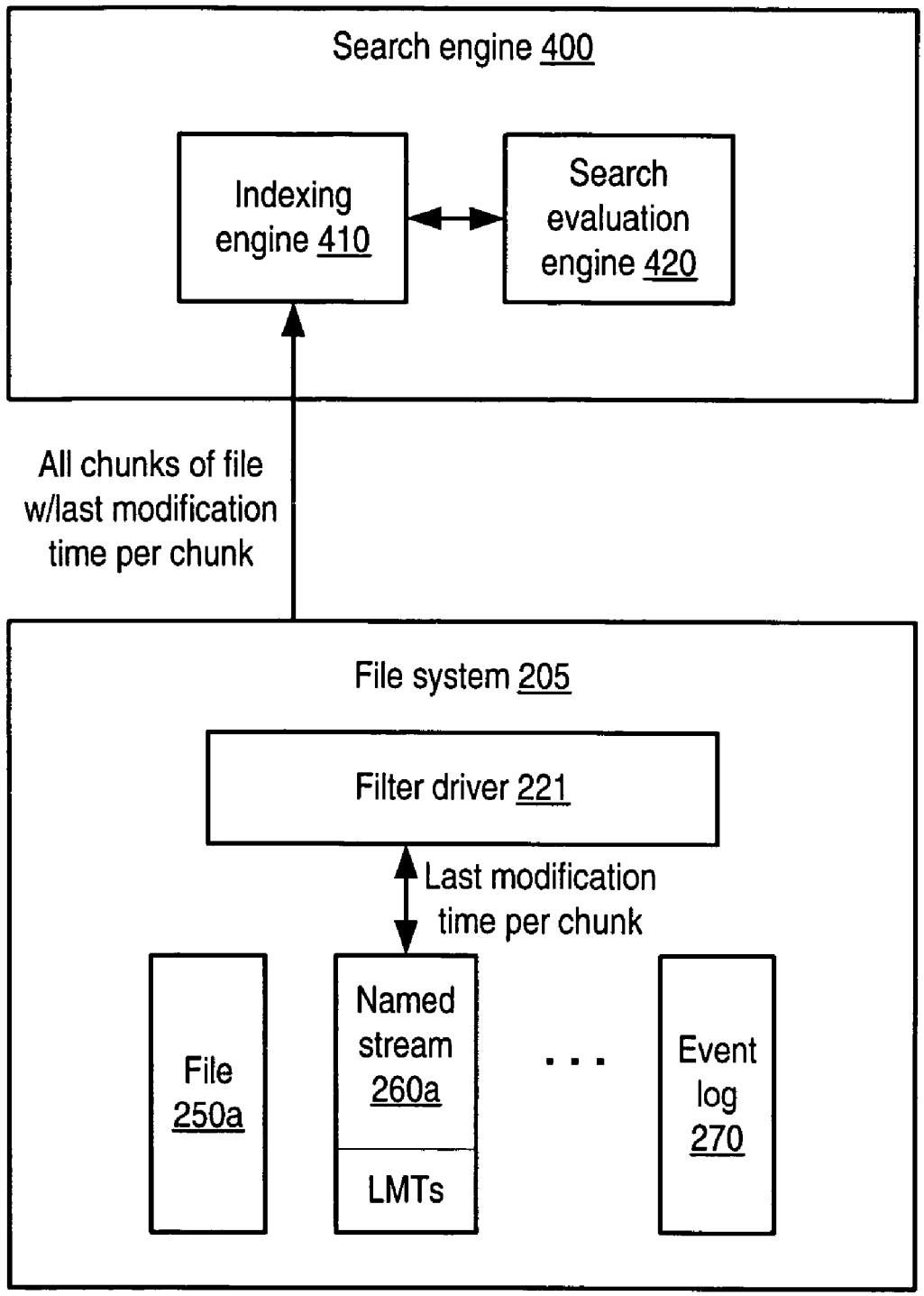
FIG. 7 is a block diagram illustrating another embodiment of a system configured to perform chunk-based indexing.

An alternative embodiment in which indexing engine 410 may be configured to regenerate index information for those logical chunks identified as modified by file system 205 is illustrated in FIG. 7. In the illustrated embodiment, each of the elements of search engine 400 and file system 205 may be configured similarly to the corresponding elements illustrated in FIG. 5 and described above, with the exception that rather than associating a respective modification identifier with each logical chunk as described above, file system 205 may be configured to associate a respective last modification time with each logical chunk. Generally speaking, a last modification time of a logical chunk may be any suitable indication of the point in time that logical chunk was last modified, e.g., due to a file-modifying operation. In various embodiments, a last modification time may be a timestamp in any suitable format. For example, a last modification time may explicitly include year, month, date, hour, minute, second, and fractional second information. Alternatively, a last modification time may be represented as a single integer or floating-point value indicating the number of units of time (e.g., seconds) elapsed since a fixed reference point. In some embodiments, the resolution of the last modification time may depend on the frequency with which the last modification time is referenced by search engine 400. For example, if a last modification time is referenced once a minute or less often, it may not be necessary to include fractional seconds (or possibly seconds) in the last modification time.

In the illustrated embodiment, the respective last modification times (shown as LMTs) of the logical chunks comprising given file 250 are stored within corresponding named stream 260, although in other embodiments the last modification times may be stored elsewhere. In some embodiments, the last modification times may be stored as structured data, such as an XML record or a tabular format.

The last modification time associated with a given logical chunk may be included within the index information generated for the given chunk by indexing engine 410, in one embodiment. Additionally, upon detecting an operation to modify a given file 250, file system 205 may be configured to identify one or more modified logical chunks in a manner similar to that described above in conjunction with the description of FIG. 5. File system 205 may also be configured to update the last modification times associated with the modified logical chunk(s). Consequently, at a given point in time, different logical chunks may have different last modification times.

Similar to the embodiment of FIG. 5, indexing engine 410 may initiate regeneration of index information in response to different events in different embodiments. For example, search engine 400 may scan file system 205 at intervals, independent of file system content access events, or search engine 400 may monitor file system content access events and may initiate index information regeneration in response to detecting certain events. In the illustrated embodiment, file system 205 may provide the last modification time of each logical chunk of given file 250 (e.g., as indicated within named stream 260 or elsewhere) to indexing engine 410. For a given logical chunk, indexing engine 410 may compare the last modification time provided by file system 205 with the last modification time included in the index information previously generated for the given logical chunk. In response to determining that the last modification time provided by file system 205 is more recent than the last modification time included in the corresponding index information, indexing engine 410 may be configured to regenerate the index information associated with the given logical chunk. In one embodiment, if no corresponding index information exists for a given chunk when indexing engine 410 attempts this comparison, indexing engine 410 may generate the index information by default. It is noted that although the last modification time of each chunk of given file 250 may be conveyed to indexing engine 410 by file system 205, in the illustrated embodiment, indexing engine 410 may be configured to regenerate index information for those logical chunks that have been modified according to their last modification times, while skipping index information regeneration for those logical chunks that have not been modified.

Figure 8:
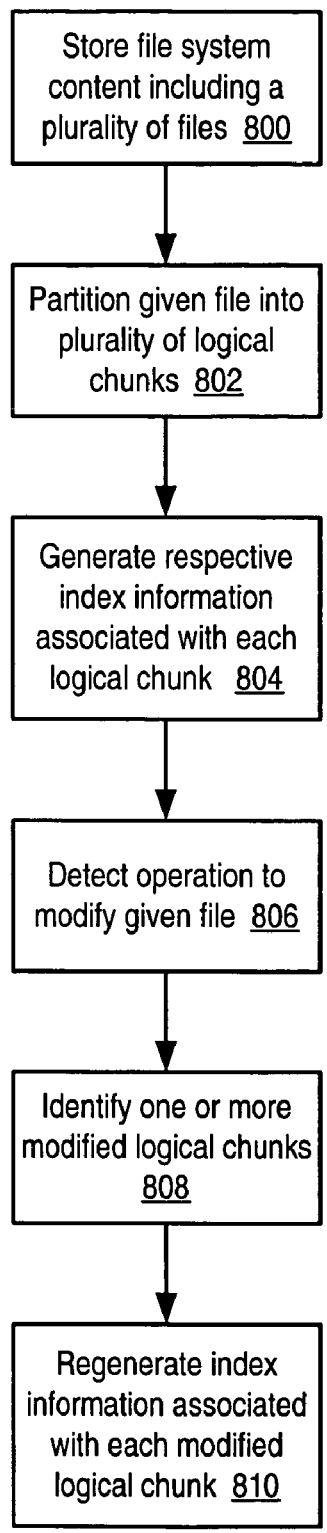
FIG. 8 is a flow diagram illustrating one embodiment of a method of chunk-based index information generation and regeneration.

One embodiment of a method of chunk-based index information generation and regeneration is illustrated in FIG. 8. Referring collectively to FIG. 1 through FIG. 8, operation begins in block 800 where file system content including a plurality of files 250 is stored. A file system is then configured to partition a given file 250 into a plurality of logical chunks (block 802). As described above, the logical chunks may be of a fixed, uniform size or of variable size in various embodiments.

Additionally, respective index information associated with each of the logical chunks of given file 250 is generated (block 804). For example, indexing engine 410 may be configured to treat each logical chunk as a separate document and generate corresponding index information as described above.

An operation to modify given file 250 is detected (block 806) and responsively, one or more modified logical chunks of given file 250 are identified (block 808), for example by filter driver 221. In some embodiments, modified logical chunks may be indicated by assertion of a corresponding modification identifier, while in other embodiments, modified logical chunks may be indicated by updating a corresponding last modification time, each as described previously.

Finally, index information associated with each modified logical chunk is regenerated (block 810). For example, in various embodiments indexing engine 410 may regenerate index information for a given logical chunk dependent upon a respective modification identifier, such as a dirty bit, or dependent upon a respective last modification time provided by file system 205.

It is contemplated that any of the elements or methods illustrated in FIG. 2-8, including file system 205, search engine 400, and their various methods of operation, may be implemented as program instructions and data stored and/or conveyed by a computer-accessible medium as described above. It is also noted that assertion and deassertion of signals or indications may be implemented using different techniques in different embodiments. For example, in one embodiment signal assertion may be implemented by assigning a logic '1' value to the signal, while deassertion may be implemented by assigning a logic '0' value. However, in some embodiments this convention may be reversed, or entirely different values or tokens may be used to represent assertion and deassertion.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
a storage device configured to store data; and
a file system configured to manage access to said storage device and to store file system content including a plurality of files to said storage device; and
a search engine configured to construct an index of said file system content;
wherein said file system is further configured to partition a given one of said plurality of files into a plurality of logical chunks, wherein given ones of said logical chunks include structured data records formatted according to a self-describing data format, wherein each of said structured data records includes one or more data elements delimited by respective tag fields, wherein said tag fields are defined according to said self-describing data format;
wherein to partition said given file, said file system is further configured to adjust a chunk boundary between two adjacent given ones of said logical chunks such that said chunk boundary falls between boundaries of said structured data records;
wherein to construct said index, said search engine is further configured to generate respective index information associated with each of said plurality of logical chunks, such that boundaries of said respective index information correspond to boundaries of said logical chunks;
wherein for each given one of said plurality of logical chunks, said respective index information is indicative of one or more data patterns occurring within said given logical chunk of said given file; and
wherein in response to detecting an operation to modify said given file, said file system is further configured to identify one or more modified logical chunks of said given file, and wherein said search engine is further configured to regenerate respective index information associated with each of said one or more modified logical chunks without regenerating respective index information for one or more logical chunks of said given file that are unmodified by said operation.

2. The system as recited in claim 1, wherein said file system is further configured to associate a respective modification identifier with each of said logical chunks and to assert said respective modification identifier in response to modifying a corresponding logical chunk of said given file, and wherein said search engine is further configured to regenerate respective index information associated with a given logical chunk dependent upon said respective modification identifier.

3. The system as recited in claim 1, wherein said file system is further configured to associate a respective last modification time with each of said logical chunks and to update said respective last modification time in response to modifying a corresponding logical chunk of said given file, and wherein said search engine is further configured to regenerate respective index information associated with a given logical chunk dependent upon said last modification time.

4. The system as recited in claim 3, wherein for said given logical chunk, said search engine is further configured to compare a last modification time included in said respective index information associated with said given logical chunk with said respective last modification time provided by said file system, and to regenerate said respective index information in response to determining that said respective last modification time provided by said file system is more recent than said last modification time included in said respective index information.

5. The system as recited in claim 1, wherein each of said logical chunks is of a fixed and uniform size.

6. The system as recited in claim 1, wherein said logical chunks vary in size.

7. A computer implemented method, comprising:
a file system storing file system content including a plurality of files to a storage device, wherein said file system is configured to manage access to said storage device;
said file system partitioning a given one of said plurality of files into a plurality of logical chunks, wherein given ones of said logical chunks include structured data records formatted according to a self-describing data format, wherein each of said structured data records includes one or more data elements delimited by respective tag fields, wherein said tag fields are defined according to said self-describing data format;

wherein said file system partitioning said given file comprises said file system adjusting a chunk boundary between two adjacent given ones of said logical chunks such that said chunk boundary falls between boundaries of said structured data records;

a search engine constructing an index of said file system content, wherein said constructing includes generating respective index information associated with each of said plurality of logical chunks such that boundaries of said respective index information correspond to boundaries of said logical chunks, and wherein for each given one of said plurality of logical chunks, said respective index information is indicative of one or more data patterns occurring within said given logical chunk of said given file;

in response to detecting an operation to modify said given file, said file system identifying one or more modified logical chunks of said given file; and said search engine regenerating respective index information associated with each of said one or more modified logical chunks without regenerating respective index information for one or more logical chunks of said given file that are unmodified by said operation.

8. The method as recited in claim 7, further comprising:
said file system associating a respective modification identifier with each of said logical chunks;
said file system asserting said respective modification identifier in response to modifying a corresponding logical chunk of said given file; and
said search engine regenerating respective index information associated with a given logical chunk dependent upon said respective modification identifier.

9. The method as recited in claim 7, further comprising:
said file system associating a respective last modification time with each of said logical chunks;
said file system updating said respective last modification time in response to modifying a corresponding logical chunk of said given file; and
said search engine regenerating respective index information associated with a given logical chunk dependent upon said last modification time.

10. The method as recited in claim 9, further comprising:
said search engine comparing a last modification time included in said respective index information associated with said given logical chunk with said respective last modification time associated with said given logical chunk; and
said search engine regenerating said respective index information in response to determining that said respective last modification time provided by said file system is more recent than said last modification time included in said respective index information.

11. The method as recited in claim 7, wherein each of said logical chunks is of a fixed and uniform size.

12. The method as recited in claim 7, wherein said logical chunks vary in size.

13. A computer-accessible storage medium comprising program instructions, wherein the program instructions are executable to implement:
a file system storing file system content including a plurality of files to a storage device, wherein said file system is configured to manage access to said storage device;
said file system partitioning a given one of said plurality of files into a plurality of logical chunks, wherein given ones of said logical chunks include structured data records formatted according to a self-describing data format, wherein each of said structured data records includes one or more data elements delimited by respective tag fields, wherein said tag fields are defined according to said self-describing data format; and wherein said file system partitioning said given file comprises said file system adjusting a chunk boundary between two adjacent given ones of said logical chunks such that said chunk boundary falls between boundaries of said structured data records;

a search engine constructing an index of said file system content, wherein said constructing includes generating respective index information associated with each of said plurality of logical chunks such that boundaries of said respective index information correspond to boundaries of said logical chunks, and wherein for each given one of said plurality of logical chunks, said respective index information is indicative of one or more data patterns occurring within said given logical chunk of said given file;

in response to detecting an operation to modify said given file, said file system identifying one or more modified logical chunks of said given file; and said search engine regenerating respective index information associated with each of said one or more modified logical chunks without regenerating respective index information for one or more logical chunks of said given file that are unmodified by said operation.

14. The computer-accessible storage medium as recited in claim 13, wherein the program instructions are further executable to implement:
said file system associating a respective modification identifier with each of said logical chunks;
said file system asserting said respective modification identifier in response to modifying a corresponding logical chunk of said given file; and
said search engine regenerating respective index information associated with a given logical chunk dependent upon said respective modification identifier.

15. The computer-accessible storage medium as recited in claim 13, wherein the program instructions are further executable to implement:
said file system associating a respective last modification time with each of said logical chunks;
said file system updating said respective last modification time in response to modifying a corresponding logical chunk of said given file; and
said search engine regenerating respective index information associated with a given logical chunk dependent upon said last modification time.

16. The computer-accessible storage medium as recited in claim 15, wherein the program instructions are further executable to implement:
said search engine comparing a last modification time included in said respective index information associated with said given logical chunk with said respective last modification time associated with said given logical chunk; and
said search engine regenerating said respective index information in response to determining that said respective last modification time provided by said file system is more recent than said last modification time included in said respective index information.

17. The computer-accessible storage medium as recited in claim 13, wherein each of said logical chunks is of a fixed and uniform size.

18. The computer-accessible storage medium as recited in claim 13, wherein said logical chunks vary in size.

19. The system as recited in claim 1, wherein to adjust said chunk boundary between said two adjacent given ones of said logical chunks, said file system is further configured to adjust said chunk boundary such that said chunk boundary falls between instances of said tag fields.

20. The system as recited in claim 1, wherein said self-describing data format comprises Extensible Markup Language (XML).

21. The method as recited in claim 7, wherein said file system adjusting said chunk boundary between said two adjacent given ones of said logical chunks comprises said file system adjusting said chunk boundary such that said chunk boundary falls between instances of said tag fields.

22. The method as recited in claim 7, wherein said self-describing data format comprises Extensible Markup Language (XML).

23. The computer-accessible storage medium as recited in claim 13, wherein said file system adjusting said chunk boundary between said two adjacent given ones of said logical chunks comprises said file system adjusting said chunk boundary such that said chunk boundary falls between instances of said tag fields.

24. The computer-accessible storage medium as recited in claim 13, wherein said self-describing data format comprises Extensible Markup Language (XML).

* * * * *